United States Patent
Reul et al.

(10) Patent No.: US 9,908,380 B2
(45) Date of Patent: Mar. 6, 2018

(54) METHOD FOR OPERATING A MOTOR VEHICLE, COMPUTER SOFTWARE PRODUCT, CHASSIS ARRANGEMENT AND MOTOR VEHICLE

(71) Applicant: GM GLOBAL TECHNOLOGY OPERATIONS LLC, Detroit, MI (US)

(72) Inventors: Marcus-Andre Reul, Nauheim (DE); Mathias Molitor, Geisenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 15/007,963

(22) Filed: Jan. 27, 2016

(65) Prior Publication Data

US 2016/0214455 A1    Jul. 28, 2016

(30) Foreign Application Priority Data

Jan. 28, 2015   (DE) .................. 10 2015 001 015

(51) Int. Cl.
| | |
|---|---|
| *B60G 17/018* | (2006.01) |
| *B60G 17/016* | (2006.01) |
| *B60Q 1/115* | (2006.01) |
| *B60G 17/08* | (2006.01) |

(52) U.S. Cl.
CPC ......... *B60G 17/016* (2013.01); *B60G 17/018* (2013.01); *B60G 17/08* (2013.01); *B60Q 1/115* (2013.01); *B60G 2400/106* (2013.01); *B60G 2400/208* (2013.01); *B60G 2400/60* (2013.01);
(Continued)

(58) Field of Classification Search
CPC .... B60Q 1/115; B60G 17/016; B60G 17/018; B60G 17/08; B60G 2400/106; B60G 2400/208; B60G 2400/60; B60G 2500/10; B60G 2600/02; B60G 2600/20
See application file for complete search history.

(56) References Cited

U.S. PATENT DOCUMENTS 5,037,119 A * 8/1991 Takehara ........... B60G 17/0163
                                                   180/415
5,527,060 A    6/1996 Kutsche
(Continued)

FOREIGN PATENT DOCUMENTS

DE    4430364 A1    2/1996
DE    19922745 A1   12/2000
(Continued)

OTHER PUBLICATIONS

German Patent Office, German Search Report for German Application No. 102015001015.8, dated Sep. 30, 2015.

*Primary Examiner* — Hussein El Chanti
(74) *Attorney, Agent, or Firm* — Lorenz & Kopf LLP

(57) ABSTRACT

A method for operating a motor vehicle having at least a first axle and at least a second axle, wherein the motor vehicle has a chassis that can be adjusted by the user, and which is operable at least in a first mode and at least in a second mode, which is more comfortable than the first mode. When the user activates the more comfortable second mode, a loading state of the motor vehicle is checked. The chassis is not shifted from the first mode into the second mode for at least axle, or is changed from the second mode into the first mode of the chassis if a limit load is exceeded.

8 Claims, 1 Drawing Sheet

(52) U.S. Cl.
CPC ...... *B60G 2500/10* (2013.01); *B60G 2600/02* (2013.01); *B60G 2600/20* (2013.01)

(56) References Cited

U.S. PATENT DOCUMENTS

| | | | | |
|---|---|---|---|---|
| 6,282,890 | B1* | 9/2001 | Takano | E02F 9/2203 60/420 |
| 8,423,244 | B2 | 4/2013 | Proemm et al. | |
| 2002/0035423 | A1* | 3/2002 | Shank | B60G 17/0185 701/37 |
| 2004/0199313 | A1* | 10/2004 | Dellinger | B60G 17/015 701/37 |
| 2005/0047152 | A1* | 3/2005 | Okumura | B60Q 1/115 362/464 |
| 2010/0114437 | A1* | 5/2010 | Boss | B60K 28/08 701/48 |
| 2011/0036646 | A1* | 2/2011 | Dack | G01G 19/10 177/136 |
| 2012/0245795 | A1* | 9/2012 | Matsuzaki | B60G 9/02 701/38 |
| 2014/0261060 | A1* | 9/2014 | Dumalski | B60F 1/005 105/72.2 |
| 2014/0350787 | A1* | 11/2014 | Swanson | B60G 17/0195 701/38 |
| 2015/0112512 | A1* | 4/2015 | Fan | H04L 67/12 701/2 |
| 2015/0137463 | A1* | 5/2015 | McLennan | B60G 17/016 280/6.153 |
| 2016/0152107 | A1* | 6/2016 | Ranjan | B60G 15/065 267/225 |

FOREIGN PATENT DOCUMENTS

| | | |
|---|---|---|
| EP | 1172239 A2 | 1/2002 |
| JP | H0281710 A | 3/1990 |

* cited by examiner

METHOD FOR OPERATING A MOTOR VEHICLE, COMPUTER SOFTWARE PRODUCT, CHASSIS ARRANGEMENT AND MOTOR VEHICLE

CROSS-REFERENCE TO RELATED APPLICATION

This application claims priority to German Patent Application No. 102015001015.8, filed Jan. 28, 2015 which is incorporated herein by reference in its entirety.

TECHNICAL FIELD

The present disclosure pertains to a method for operating a motor vehicle in at least a first mode and a second mode which is more comfortable than the first mode. The present disclosure also provides a computer software product, a chassis arrangement for a motor vehicle and a motor vehicle operable in in at least a first mode and a second mode which is more comfortable than the first mode.

BACKGROUND

Adaptive chassis are known in the prior art. Adaptive chassis may include chassis components that are continuously adjustable or that allow discrete changing between fixed operating modes, such as characteristic curves. Regulated damping systems that use additional sensors to capture vehicle body movements and/or road surface excitations help to improve handling as well as comfort compared with a non-adaptive chassis.

For example, adaptive chassis may support different operating modes, allowed by the chassis configuration for different purposes, such as a stiffer chassis configuration for sporty driving styles. Other functions may also be enabled, such as automatic levelling, for example.

One disadvantage associated with such conventional chassis is that a sophisticated sensor system and fast regulating equipment in the chassis is needed, which in turn makes such systems expensive, so they are often not suitable for use in smaller vehicles or the basic models of certain model lines, but are reserved instead for the more comprehensive equipment packages or must be ordered in special equipment packages that are only available at additional cost.

Less expensive, two-stage damping systems are also known, though the configuration of these is still subject to the requirements that apply to a normal passive chassis. Particularly in the softest of the available configurations, which can be created using various damping characteristic curves, the safety of the vehicle must always be guaranteed even in the maximum loaded state. As a consequence, the softer or more comfortable configuration must be stiffer than is desirable for a configuration with the ideal comfort level. This limits the maximum degree of driving comfort achievable in the unloaded state. For this reason, the known multistage, passive chassis systems with multiple configurations are usually only used to improve the handling properties of a vehicle on stretches of road that lend themselves to sporty driving, provision is not made for greater driving comfort.

Document DE 10 2009 021 671 A1 discloses a device and method for regulated damping of a motor vehicle in which a set of adjustment parameters are stored for adjusting the damping of an unloaded vehicle depending on the conditions relating to its driving dynamics. A loading state of the vehicle is detected. The set of adjustment parameters are adjusted depending on the detected load state such that damping of the vehicle is adjusted according to the set of adjustment parameters depending on the conditions relating to the vehicle's driving dynamics. A driver of the vehicle can set the desired degree of damping by preselecting different damper modes.

SUMMARY

The present disclosure provides methods, computer software products, chassis arrangements and motor vehicles of the kind described in the introduction in such manner that an inexpensive, adjustable chassis may be created, which can be configured for greater comfort than conventional chassis. According to a first aspect, a method for operating a motor vehicle is described. The motor vehicle has at least a first axle and at least a second axle and is equipped with a chassis that can be adjusted by a user. The chassis is operable in at least a first mode and at least one mode that is more comfortable than the first mode. Chassis of such kind that are perceived to be more comfortable than the first mode are softer, and accordingly have softer characteristic curves, which are associated with a longer deflection path both inwards and outwards than the first mode when the same loads are exerted on them, More comfortable chassis modes are thus felt to be less stiff than sportier chassis modes.

According to the method described, it is provided that the user activates the more comfortable second mode. The user of the motor vehicle may particularly be the driver of the motor vehicle. In some variants, it may be possible to activate the more comfortable second mode from inside the motor vehicle, particularly while the vehicle is being operated.

A loading state of the motor vehicle is also tested as part of the method. Testing of the loading states may particularly be carried out by the user in a chronological sequence with the activation of the more comfortable second mode, particularly after the activation. In this way, the loading state can be tested as soon as the user activates the more comfortable second mode. Further or additionally, the loading state may be tested intermittently or continuously while the more comfortable second mode is activated in order to detect changing loading states.

In a further step, it is provided that the chassis is not shifted into the second mode, or it is shifted into the first mode at the at least one second axle when a limit load is exceeded. Accordingly, when the load limit is exceeded, the chassis state at the at least one second axle is in the first mode. In this way, it is possible to prevent the more comfortable mode from being activated at the at least one second axle when the load limit is exceeded. If the more comfortable second mode has been activated, when additional load is applied the first mode can be activated as soon as the limit load is exceeded. The chassis mode at the second axle thus remains in the stiffer configuration, thereby preventing the rear chassis from bottoming out.

The limit load may be determined on the basis of the weight of the vehicle's added load or a comparable value, for example. The limit load may be defined by the adaptive suspension in the more comfortable second mode, and selected such that bottoming out of the chassis under normal conditions is impossible with loads below the limit load. Safety margins that are applied as standard in the industry can be included in the calculations when configuring and defining the limit load.

This makes it possible to configure the more comfortable mode less rigidly than in conventional configurable chassis with passive chassis components, thus raising the general level of comfort. The sensor system that is needed to detect the loading state according to the present aspect is less expensive than the rapid sensor systems mounted on chassis components that must be used with active chassis, which in turn lowers the costs associated with a correspondingly equipped motor vehicle compared with motor vehicles whose chassis are adapted actively, without thereby sacrificing any driving comfort compared with such vehicles.

The more comfortable second mode can still be or remain activated at the at least one first axle within correspondingly high added loads, so that comfortable driving behavior is possible even at higher load states. If the load is or becomes lower than the limit load, the second, more comfortable chassis mode may also be activated at the at least one second axle.

In one variant, the at least one first axle may be a front axle. The at least one second axle may be a rear axle. A luggage compartment of a motor vehicle is often located close to the rear axle, which is why the load on the rear axle has the greatest variability in such vehicles. In alternative variants, the first axle may be a rear axle and the second may be a front axle.

A first more refined aspect of the method provides that the first and the second (more comfortable) modes have different damping characteristic curves. The first mode may have a stiffer configuration than the second mode.

A further possible aspect of the method provides that the loading state of the motor vehicle is detected using a longitudinally dynamic vehicle model, With corresponding longitudinally dynamic vehicle models, for example engine torque, braking moments, accelerations as a function of the position of the gas pedal, and other such values, information may be deduced regarding the loading state of the motor vehicle. As a rule, most modern vehicles do not need to be fitted with any additional sensor systems in order to obtain such data, because the equipment is already installed. Thus, an additional benefit may be gained without any additional sensor equipment by using longitudinally dynamic vehicle models.

Another more refined aspect provides that the loading state of the motor vehicle is detected by means of an automatic headlight range adjustment system. Automatic headlight range adjustment systems must determine the inclination of the motor vehicle relative to the road in order to be able to set the headlights correctly so that they do not dazzle other road users. The sensor equipment necessary for this can be used at the same time to determine the loading state of the vehicle and adjust the corresponding chassis components.

Another more refined aspect provides that the second mode is activated on the at least one first axle on the chassis. This increases the comfort level offered by such motor vehicles even though the load is greater.

A further more refined aspect may provide that the first mode is or remains activated both at the at least one first axle and at the at least one second axle when a second higher load limit is exceeded. In this way, a safe driving behavior may be maintained even with correspondingly high added loads.

The present disclosure further provides means for operating a motor vehicle that has at least one first axle and at least one second axle. The motor vehicle has a chassis that can be adjusted via input means operated by a user, which vehicle is operable in a first mode and in a second mode, which is more comfortable than the first mode. Means for testing a loading state of the motor vehicle are activated when the more comfortable second mode is activated by the user via the input means. Control means are also provided that prevent the chassis from being shifted into the second, more comfortable mode nod/or activate the first mode at the at least one second axle when a limit load registered by the mans for detecting the loading state is exceeded.

A first more refined aspect thereof provides that the chassis is equipped with dampers at the at least one first axle and dampers at the at least one second axle, which dampers are operable in different damping characteristic curves. A further aspect provides that means for detecting the loading state test longitudinally dynamic vehicle parameters. A further aspect provides that the means for detecting the loading state of the motor vehicle include an automatic headlight range adjustment system. A more refined development of a further aspect thereof provides that the control means are designed in such manner that the second, more comfortable mode can be activated at the first axle.

A further independent object relates to a computer software product with a non-transitory machine-readable storage medium, on which commands are embedded, which commands, when executed by a computing unit, ensure that the computing unit is set up so that it can perform a method according to the aspects described in the preceding text. The storage medium may be a memory; the computing unit may be a controller of a motor vehicle.

A further independent object relates to a chassis arrangement for a motor vehicle, wherein the motor vehicle has at least one first axle and at least one second axle. According to a first aspect, at least one adjustable chassis component that may be disposed on the at least one first axle is provided and is operable in at least a first mode and in at least a second mode, which is more comfortable than the first. In addition, at least one adjustable chassis component that may be disposed on the at least one second axle is provided, and is operable in at least a first mode and in at least a second mode, which is more comfortable than the first. The first mode is thus stiffer than the second, more comfortable mode. A stiffer adaptive suspension normally means higher damping values and/or higher resilience values. Stiffer chassis thus spring back less than more comfortable chassis under the same load, with the result that unevenness in the road surface are compensated to a lesser degree with stiffer chassis and are therefore felt more strongly by passengers. Usually, at least one chassis component is provided per wheel.

In addition, at least one loading state detection system is provided. The loading state detection system serves to detect the loading state of the vehicle. The loading state of the vehicle may vary between the complete absence of load and a maximum load or in some cases even an overload. The at least one loading state detection system enables the current configuration of the vehicle to be determined. Loading state detection may include a loading state sensor and/or may be carried out by means of an estimating routine executed in a processor.

In addition, a chassis mode switch that is operable by a user is provided and can be used to switch between the first mode and the more comfortable second mode. The chassis mode selector switch may be provided as a separate switch, but it may also be realized as a menu item in an electronic configuration menu of the motor vehicle. In other words, the chassis mode selector switch does not have to be a physical switch in the classic meaning of the word. The essential point is that the corresponding chassis mode can be selected by the user. If further modes are available besides the first mode and the more comfortable second mode, these may also be activated as desired via the chassis mode selector switch.

A controller is also provided and is connected to the chassis triode selector switch, the at least one loading state detecting system, the at least one chassis component of the at least one first axle and the at least one chassis component of the at least one second axle. The controller is configured so as to prevent activation of the more comfortable second mode of the at least one chassis component of the at least one second axle or to switch from the second mode into the first mode when aloud above the limit load is detected via the loading state sensor. In this way, it is possible for the rear axle chassis component to prevent excessive deflection or even bottoming out if the load on a correspondingly equipped motor vehicle is too great. This is enabled by a softer configuration of the more comfortable second mode, which serves to increase comfort for the passengers.

A first more refined aspect of the chassis arrangement may provide that the loading state detecting system includes an acceleration sensor. The acceleration sensor may be used for example to detect longitudinal dynamics of the motor vehicle, and to deduce information about the loading state based on said longitudinal dynamics. Accordingly, fully loaded motor vehicles are less dynamic and accelerate more slowly than more lightly loaded motor vehicles with the same gas pedal position. Conclusions may then be drawn about the added load by correlating the gas pedal position with the acceleration produced thereby.

A corresponding acceleration sensor may have the form of a wheel speed sensor, for example. Wheel speed sensors are typically installed in most modern motor vehicles to control an anti-lock braking system. The acceleration sensor may also be provided as a separate sensor. The acceleration sensor may be designed such that a gradient in the road a vehicle is currently climbing can be detected.

Alternatively or in addition thereto, the loading state sensor may be a part of an automatic headlight range adjustment system. Automatic headlight range adjustment systems need information about the current angle of the motor vehicle relative to the road, this information being derived from different loads of the front axle chassis and the rear axle chassis compared with an unloaded state. Compensation is then made for such angles by adjusting the headlights. Conclusions about the load on the motor vehicle may be made on the basis of the angle of the motor vehicle, so that the information obtained in this manner can be used to set the rear axle chassis component. If multiple loading state sensors are used in combination, particularly sensors with different functioning methods, redundancy and detection accuracy can be improved.

According to a further possible aspect of the chassis arrangement, the front axle chassis component and/or the rear axle chassis component may each include at least one adjustable shock absorber. It is relatively easy to configure shock absorbers so that different operating modes are possible, in particular a stiffer mode and a more comfortable mode. Such shock absorbers are equipped for example with switchable valves that can open and close flow channels and so influence the damping characteristic curve correspondingly. Since the shock absorbers are in the form of an adjustable chassis component, the advantages of the chassis arrangement described here can also be obtained with relatively inexpensive conventional spring arrangements, preferably steel springs. More sophisticated spring systems such as air springs are then unnecessary.

According to a more refined aspect, the shock absorbers can be switchable between two damping characteristic curves or more than two damping characteristic curves. Stiffer damping characteristic curves damp impulses over a shorter path than more comfortable damping characteristic curves.

Another more refined aspect of the chassis arrangement provides that the controller has an inhibit circuit to prevent the more comfortable second mode being activated if a load greater than a limit load has been detected by the at least one loading state sensor.

According to a more refined aspect of the chassis arrangement, the shock absorbers may be adjustable electrically. Electrically adjustable shock absorbers can easily be controlled remotely via the controller.

Another more refined aspect of the chassis arrangement provides that the shock absorbers are discretely switchable shock absorbers. Discretely switchable shock absorbers are shock absorbers that are not adjusted via body sensor systems. Accordingly, discretely switchable shock absorbers do not have any inbuilt driving dynamics sensors. Discretely switchable shock absorbers of such kind are thus less expensive than active shock absorbers, since the associated controls and the sensors therefor that need to be attached to the shock absorbers are not required.

Another more refined aspect provides a motor vehicle having a chassis arrangement of the type described in the preceding text.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
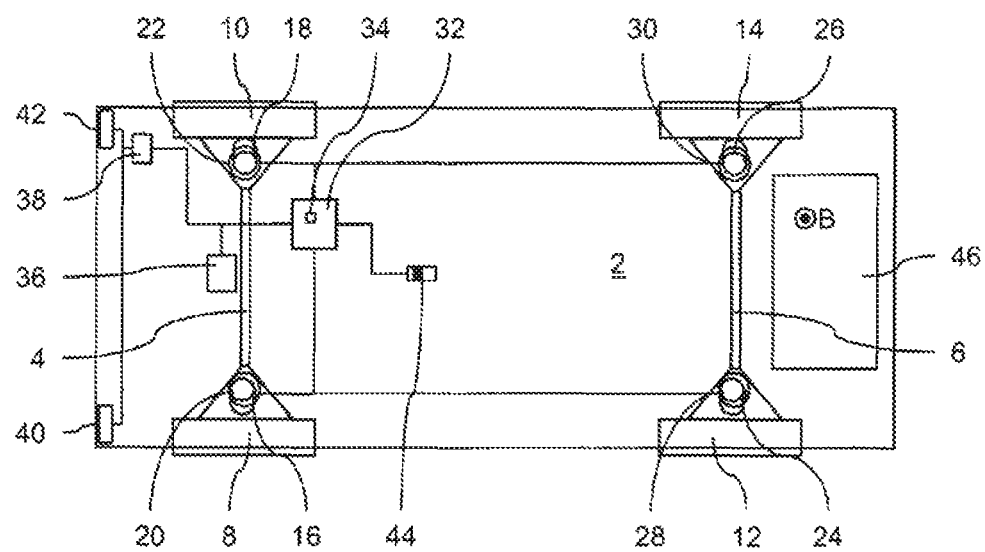
FIG. 1 is a schematic top view of a motor vehicle.

FIG. 1 shows a top view of a motor vehicle 2. Motor vehicle 2 has a front axle 4 and a rear axle 6. Two steered wheels 8, 10 are provided on front axle 4. Two non-steered wheels 12, 14 are provided on rear axle 6. Front wheels 8, 10 are mounted on a front axle chassis with shock absorber 16, 18 and springs 20, 22, rear wheels 12, 14 are mounted with shock absorbers 24, 26 and springs 28, 30. Shock absorbers 16, 18, 24, 26 are adjustable, and can be operated in a stiff first mode and a relatively more comfortable second mode. For this purpose, shock absorbers 16, 18, 24, 26 can vary flow resistances for a damper fluid, such as oil. The corresponding chassis for guiding wheels 8, 10, 12, 14 may be equipped with additional components, not shown here, such as stabilizers or the like.

Motor vehicle 2 also has a controller 32, which is connected to the adjustable shock absorbers 16, 18, 24, 26 and is able to control them in such manner that shock absorbers 16, 18, 24, 26 are able to switch back and forth between the first mode and the second mode, in other words a corresponding mode can be selected. Controller 32 has a memory 34, in which a computer software product is stored, and when loaded and executed by controller 32, said product effects switching of the shock absorbers 16, 18, 24, 26 according to a certain logic. This logic will be explained in greater detail in the context of FIG. 2. In some variations, controller 32 may be designed such that instead of a computer program an electrical switching logic is provided, which makes use of the same algorithm as a corresponding computer program.

Controller 32 is connected to an acceleration sensor 36. Acceleration sensor 36 may be a separate acceleration sensor, as illustrated here, but it may also be designed as a sensor with combined function, e.g., a wheel speed sensor. The current acceleration of motor vehicle 2 is measured using acceleration sensor 36. Correlating the current acceleration of motor vehicle 2 with a position of a gas pedal—not shown—allows conclusions to be drawn regarding an added load B. The greater the added load B, the less the acceleration for a constant gas pedal position under the same conditions. Controller 32 is further connected to automatic headlight range adjustment system 38 for headlights 40, 42. Headlight range adjustment system 38 may be an inclinometer, for example, which may serve to check the angle of motor vehicle 2 relative to the road. In some variants, only one sensor may be provided instead of the two sensors, the acceleration sensor 36 and a headlight range adjustment system 38.

A chassis mode switch 44 is also provided. Chassis mode switch 44 is arranged inside motor vehicle 2 and can be operated by a driver of motor vehicle 2. Chassis mode switch 44 may be constructed as a physical switch. It may also have the form of an electronic switch, e.g. a menu item in a motor vehicle configuration menu. Other possible variations of chassis mode selector switch 44 are also conceivable, a switch that is actuated acoustically, for example.

Motor vehicle 2 is loaded with goods for transport 46. Goods for transport 46 are located in an area in the rear of vehicle 2, close to rear axle 6. This is the area in which the luggage compartment is located in most motor vehicles. As the goods for transport 46 are located close to rear axle 6, greater force is exerted on chassis components 24, 26, 28, 30 of rear wheels 12, 14. Consequently, when the vehicle travels over unevenness in the road, chassis components 24, 26, 28, 30 have to absorb stronger forces and greater moments.

The technology described here can also be used in motor vehicles in which the luggage compartment is located in the front, simply by reversing the front and rear axles correspondingly.

Figure 2:
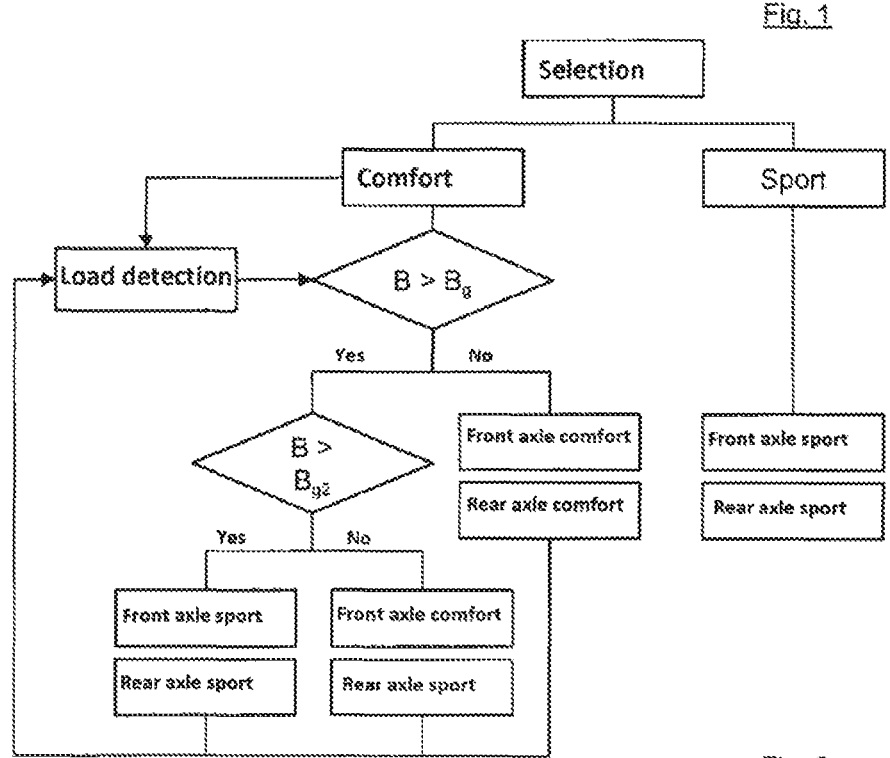
FIG. 2 is a flowchart of the method.

FIG. 2 shows a flowchart of the method. A driver uses chassis mode selector switch 44 to make his selection, setting either a sport mode or a comfort mode. In sport mode, shock absorbers 16, 18 are actuated by controller 32 so that they are in the first, stiffer or sport mode, that is to say they have greater damping than in a corresponding comfort mode. If the driver uses chassis mode selector switch 44 to activate comfort mode, a load detecting system tests checks whether added load B is greater than a limit load $B_G$. If this is not the case, the shock absorbers 16, 18 on front axle 4 and the shock absorbers 24, 26 of rear axle 6 are set to comfort.

If added load B reaches or exceeds limit load $B_G$, a further check is carried out to determine whether added load B is above limit load $B_{G2}$, wherein limit load $B_G$ is smaller than limit load $B_{G2}$. If this is not true, shock absorbers 16, 18 of front axle 4 are set to comfort, shock absorbers 24, 26 of rear axle 6 are set to sport. If added load B is greater than or equal to limit load $B_{G2}$, shock absorbers 16, 18 of front axle 4 and shock absorbers 24, 26 of rear axle 6 are each set to sport. If the shock absorbers 16, 18, 24, 26 in question are already in the correct mode, no switching is required.

Load detecting is repeated at regular intervals. This makes is possible to check continuously whenever comfort mode is selected whether or not limit load $B_G$ has been exceeded, if more luggage is placed in the luggage compartment or additional passengers have entered the vehicle for example, and shock absorbers 24, 26 of rear axle 6 can be actuated so that sport mode is activated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A chassis arrangement for a motor vehicle comprising:
    a first axle having a first adjustable chassis component operable at a first mode and a second mode that is more comfortable than the first mode;
    a second axle having a second adjustable chassis component opera east in the first mode and the second mode that is more comfortable than the first mode;
    a load sensor configured to detecting a loading state of the first and second axles;
    a chassis mode selector switch operable to switch between the first mode and the second mode; and
    a controller connected to the chassis mode selector switch, the load sensor, the first adjustable chassis component and the second adjustable chassis component, wherein the controller is configured to prevent an activation of the second mode of at least the second adjustable chassis component when a load greater than a limit load is detected by the load sensor.

2. The chassis arrangement according to claim 1, wherein the load sensor includes an acceleration sensor.

3. The chassis arrangement according to claim 1, wherein the load sensor comprises a component of an automatic headlight range adjustment system.

4. The chassis arrangement according to claim 1, wherein the first adjustable chassis component and the second adjustable chassis component comprises shock absorbers.

5. The chassis arrangement according to claim 4, wherein the shock absorbers are each switchable between at least two damping characteristic curves.

6. The chassis arrangement according to claim 4, wherein the shock absorbers comprise electrically adjustable shock absorbers.

7. The chassis arrangement according to claim 4, wherein the shock absorbers comprise passive shock absorbers.

8. The chassis arrangement according to claim 1, wherein the controller comprises an inhibitor circuit to prevent activation of the second mode.

* * * * *